United States Patent
Gerrish et al.

(10) Patent No.: US 9,385,878 B1
(45) Date of Patent: Jul. 5, 2016

(54) COMMUNICATION WITH NETWORK DEVICES

(71) Applicants: Kevin Gerrish, Largo, FL (US); Mark Bishop, Tampa, FL (US)

(72) Inventors: Kevin Gerrish, Largo, FL (US); Mark Bishop, Tampa, FL (US)

(73) Assignee: Cooper Technologies Company, Houston, TX (US)

( * ) Notice: Subject to any disclaimer, the term of this patent is extended or adjusted under 35 U.S.C. 154(b) by 214 days.

(21) Appl. No.: 14/173,231

(22) Filed: Feb. 5, 2014

(51) Int. Cl.
*H04L 12/18* (2006.01)
*H04L 12/26* (2006.01)

(52) U.S. Cl.
CPC ........ *H04L 12/1863* (2013.01); *H04L 43/0817* (2013.01)

(58) Field of Classification Search
CPC .................................................. H04L 12/185
See application file for complete search history.

(56) References Cited

U.S. PATENT DOCUMENTS

| | | | |
|---|---|---|---|
| 7,903,545 B1 * | 3/2011 | Singh et al. | 370/218 |
| 8,391,148 B1 * | 3/2013 | Wang | 370/235 |
| 2003/0225835 A1 * | 12/2003 | Klien et al. | 709/205 |
| 2005/0136952 A1 * | 6/2005 | Zabawskyj et al. | 455/466 |
| 2005/0220014 A1 * | 10/2005 | DelRegno et al. | 370/230 |
| 2008/0306871 A1 * | 12/2008 | Grannan | 705/51 |
| 2010/0027455 A1 * | 2/2010 | Wang | 370/312 |
| 2010/0131633 A1 * | 5/2010 | Herlein et al. | 709/223 |
| 2011/0199901 A1 * | 8/2011 | Kavanaugh et al. | 370/230.1 |
| 2012/0124606 A1 * | 5/2012 | Tidwell et al. | 725/17 |

* cited by examiner

*Primary Examiner* — Dang Ton
*Assistant Examiner* — Nourali Mansoury
(74) *Attorney, Agent, or Firm* — King & Spalding LLP (57) ABSTRACT

A system for communicating with a network of devices is disclosed. The system can include a control device configured to send a first digital communication using a network protocol. The system can also include a number of network devices communicably coupled to the control device, where each of the plurality of network devices is configured to receive the first digital communication using the network protocol. The system can further include a first communication channel communicably coupled to the control device and the plurality of network devices. The first digital communication sent by the control device can be sent to all of the network devices using the first communication channel. The first digital communication can be addressed to a number of recipient devices of the network devices.

18 Claims, 5 Drawing Sheets

COMMUNICATION WITH NETWORK DEVICES

TECHNICAL FIELD

Embodiments described herein relate generally to communication with a network of devices, and more particularly to systems, methods, and devices for mass command and control of network devices.

BACKGROUND

At times, one or more electronic devices can be interconnected in a network. In such a case, the network can also include a control device. The control device can be used to communicate with the various devices in the network. For example, the control device can send a communication to one or more devices in the network so that those devices perform a certain task. As another example, the control device can send a communication to one or more devices in the network to determine the status of those devices.

Communication within the network can also flow the other way. In other words, communications can be sent by one or more devices in the network to the control device. For example, one or more devices in the network can send a communication to the control device that acknowledges receipt of a communication from the control device. As another example, one or more devices in the network can send a communication to the control device that notifies the control device of the status of the device.

SUMMARY

In general, in one aspect, the disclosure relates to a system for communicating with a network of devices. The system can include a control device configured to send a first digital communication using a multi-cast network protocol. The system can also include a number of network devices communicably coupled to the control device, where each of the network devices is configured to receive the first digital communication using the multi-cast network protocol. The system can further include a first communication channel communicably coupled to the control device and the network devices. The first digital communication sent by the control device can be sent to all of the network devices using the first communication channel. The first digital communication is addressed to a number of recipient devices of the network devices. The first digital communication sent by the control device comprises a unique address for each of the recipient devices.

In another aspect, the disclosure can generally relate to a method for communicating with a number of network devices. The method can include sending, using a hardware processor, a first communication to the network devices using a multi-cast network protocol. The first communication can be addressed to a number of recipient devices of the network devices. The first communication can include a unique address for each of the recipient devices.

In yet another aspect, the disclosure can generally relate to a computer readable medium that includes computer readable program code embodied therein for a method of communicating with a number of network devices. The method can include sending a first communication to the network devices using a multi-cast network protocol. The first communication can be addressed to a number of recipient devices of the network devices. The first communication can include a unique address for each of the recipient devices.

These and other aspects, objects, features, and embodiments will be apparent from the following description and the appended claims.

BRIEF DESCRIPTION OF THE DRAWINGS

The drawings illustrate only example embodiments of communication with network devices and are therefore not to be considered limiting of its scope, as communication with network devices may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

The example embodiments discussed herein are directed to systems, apparatuses, and methods of communicating with network devices. Communicating with network devices as described herein can be used in one or more of a number of applications. Such applications can include, but are not limited to, mass notification, office work stations, fire protection, and surveillance. Thus, the examples of communicating with network devices described herein are not limited to a particular application.

Example embodiments of communicating with network devices will be described more fully hereinafter with reference to the accompanying drawings, in which example embodiments of communicating with network devices are shown. Communicating with network devices may, however, be embodied in many different forms and should not be construed as limited to the example embodiments set forth herein. Rather, these example embodiments are provided so that this disclosure will be thorough and complete, and will fully convey the scope of communicating with network devices to those of ordinary skill in the art. Like, but not necessarily the same, elements (also sometimes called components) in the various figures are denoted by like reference numerals for consistency. Terms such as "first," "second," "top," "base," "open," and "closed" are used merely to distinguish one component (or part of a component or state of a component) from another. Such terms are not meant to denote a preference or a particular orientation.

Figure 1:
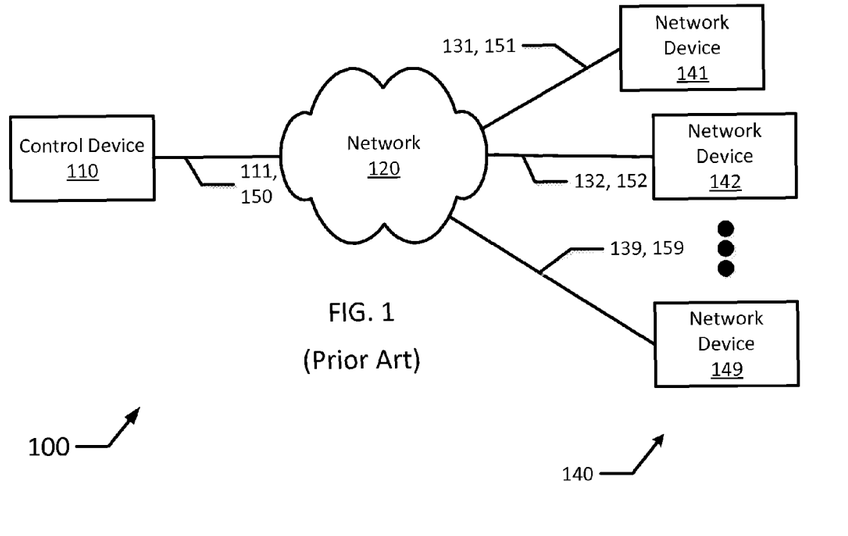
FIG. 1 shows a system diagram of a communication network as currently used in the art.

FIG. 1 shows a system diagram of a communication network 100 as currently used in the art. The communication network 100 of FIG. 1 can include a control device 110, one or more network devices 140 (e.g., network device 141, network device 142, network device 149), at least one communication channel (e.g., communication channel 150, communication channel 151, communication channel 152, communication channel 159), a network 120, and a number of protocol connections (e.g., protocol connection 111, protocol connection 131, protocol connection 132, protocol connection 139). Those skilled in the art will appreciate that a number of configurations of a communication network can be used, and that the configuration of the communication network 100 of FIG. 1 is only one example. The control device 110 is communicably coupled to each of the network devices 140.

The control device 110 can be any type of device capable of generating, sending, receiving, and interpreting communications. The communications generated and sent by the control device 110 are sent to one or more of the network devices 140. The communications sent by the control device 110 can be sent through one or more communication channels (e.g., communication channel 150) to the network 120, and then from the network 120 through one or more communication channels (e.g., communication channel 151, communication channel 159) to one or more of the network devices 140. For example, in this case, communication channel 151 allows communications to be sent from the network 120 to network device 141; communication channel 152 allows communications to be sent from the network 120 to network device 142; and communication channel 159 allows communications to be sent from the network 120 to network device 149.

Similarly, one or more of the network devices 140 can generate and send communications to the control device 110 using the same communication channels. The network devices 140 can be any type of device capable of receiving and interpreting communications from the control device 110. In addition, a network device 140 can generate a response based on a communication received from the control device 110 and send such response (another communication) through the network and communication channel(s) to the control device 110. Examples of a network device 140 can include, but are not limited to, a fire alarm, a desktop computer, an alarm panel, a printer, a fax machine, a copier, and a mobile device. A network device 140 can be called by one or more of a number of other names. For example, a network device 140 can be called an Internet protocol communicator or an IP communicator.

The communication channels described herein use wired and/or wireless technology. The network 120 can include one or more systems and/or devices for routing communications between the network devices 140 and the control device 110 through the appropriate communication channels. The network 120 can use or include the Internet, an intranet, an Ethernet, and/or some other system of digital communication. The network 120 can use wired and/or wireless technology. The network 120 can be configured so that one or more network devices 140 and/or the control device 110 can be added, removed, and/or otherwise altered to change the communication network 100.

The network 120 can use one or more Internet protocols or other communication protocols for routing the various communications throughout the communication network 100. In the currently known art, a communication generated and sent by the control device 110 to a particular network device 140 uses a transmission control protocol/Internet protocol (TCP/IP) address or connection. As described herein, a TCP/IP connection can generally be called a protocol connection. In some cases, the network 120 can be bypassed so that there is a direct connection between the control device 110 and a network device 140.

For every network device 140 in the communication network 100, there is a different TCP/IP address or protocol connection. The result is that there is a point-to-point link between the control device 110 and each network device 140. For example, in this case, the control device 110 and the network 120 can communicate using protocol connection 111; the network 120 and network device 141 can communicate using protocol connection 131; the network 120 and network device 142 can communicate using protocol connection 132; and the network 120 and network device 149 can communicate using protocol connection 139.

Once the TCP/IP connection is established between the control device 110 and a particular network device 140, the control device 110 sends communications to and receives communications from each individual network device 140 using the unique TCP/IP connection assigned to that network device 140. The TCP/IP connection requires that the control device 110 automatically resend a communication to a network device 140 to ensure delivery of the communication to the intended network device 140.

A disadvantage of using a unique TCP/IP connection for each network device 140 is that the timeliness of the response is difficult to predict, especially as network quality degrades or network congestion increases. Additionally, network bandwidth (for example, on communication channel 150) is consumed during the communication process, which increases at a multiplicative rate as congestion (the number of communications on the network system 100) increases. Another disadvantage of using a unique TCP/IP connection for each network device 140 is that additional processing capability is required to encode and decode message traffic for each TCP/IP connection.

Figure 2A:
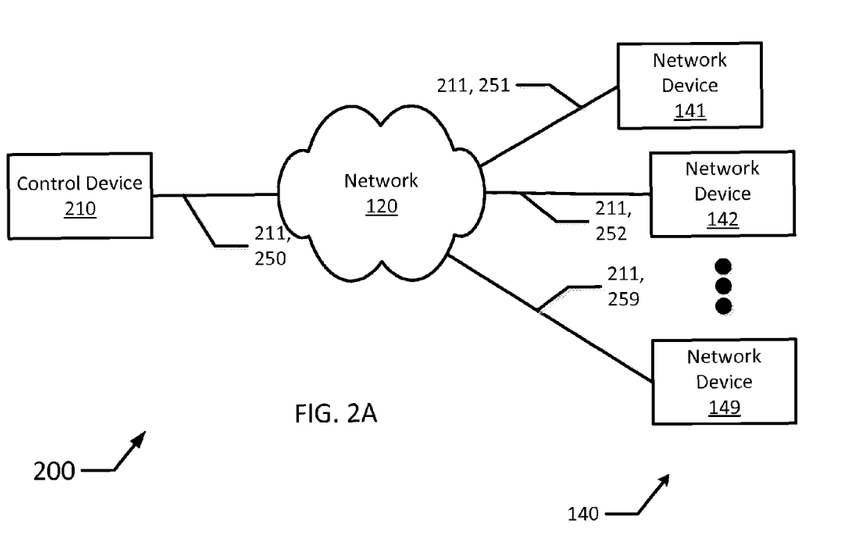
FIGS. 2A-2C show system diagrams of communication networks in accordance with certain example embodiments.
Figure 2B:
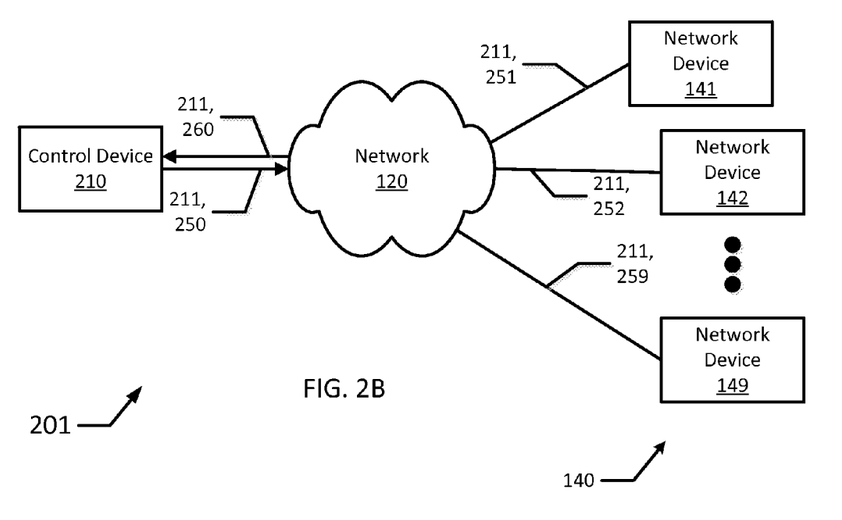
Figure 2C:
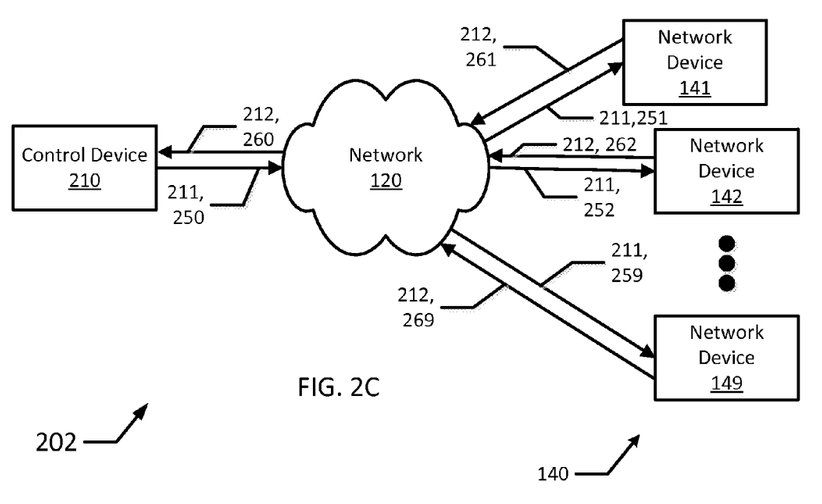

FIGS. 2A-2C show system diagrams of communication networks in accordance with certain example embodiments. Specifically, FIG. 2A shows a system diagram of communication network 200; FIG. 2B shows a system diagram of communication network 201; and FIG. 2C shows a system diagram of communication network 202. In one or more embodiments, one or more of the components shown in FIGS. 2A-2C may be omitted, added, repeated, and/or substituted. Accordingly, embodiments of communicating with network devices should not be considered limited to the specific arrangements of components shown in FIGS. 2A-2C.

Referring to FIGS. 1-2C, the network devices 140 (e.g., network device 141, network device 142, network device 149) of FIGS. 2A-2C are substantially the same as the network device 140 of FIG. 1. Similarly, the network 120 of FIGS. 2A-2C can be substantially the same as the network 120 of FIG. 1. In addition, the communication channels (e.g., communication channel 250, communication channel 251, communication channel 252, communication channel 259) of FIGS. 2A-2C can be substantially the same as the communication channels of FIG. 1.

In certain example embodiments, the control device 210 of FIGS. 2A-2C is similar to the control device 110 of FIG. 1, except as described below. Specifically, the control device 210 of FIGS. 2A-2C uses multi-cast network protocols 211 instead of TCP/IP or some other protocol used with such communication networks 100 of FIG. 1. With the multi-cast network protocol 211, a single communication is sent by the control device 210 to all of the network devices 140 in the communication network (e.g., communication network 200, communication network 201, communication network 202). In such a case, the single communication can be broadcast to all network devices 140 through the various communication channels and the network 120 of the communication network. This creates a single network traffic communication in the communication network. The multi-cast network protocol 211 can be called a real-time protocol.

As a means of contrasting, if the communication network has 100 network devices 140, the control device 210 of the communication networks of FIGS. 2A-2C sends only one communication, while the control device 110 of the communication network 100 sends one hundred communications. In other words, for a communication network with 100 network devices 140, a single network traffic communication can be used in the communication networks of FIGS. 2A-2C to communicate with all network devices 140, while the traditional TCP/IP approach of FIG. 1 would require 100 network traffic communications to each of the individual network devices 140. Thus, the control device 210 of FIGS. 2A-2C expends significantly less hardware processing in generating and sending the communication compared to the control device 110 of FIG. 1.

In certain example embodiments, for the multi-cast network protocol 211 to be effective, the data packet (communication) sent by the control device 210 to each network device 140 includes a unique address. For example, when a multi-cast communication is sent out by the control device 210, a command/request, a target address (an address of one or more particular network devices 140), and/or the address of the control device 210 can be encoded within the data packet (communication). Each network device 140 can receive the communication, inspect the target address, and determine if it has to act based on the target address. If the target address matches the configuration (address) of the network device 140, the network device 140 performs the action requested in the communication.

If a response (also called a communication) to the communication received from the control device 210 is required, the network device 140 can include the address of the control device 210 as the target address, while including its own address as the source address to transmit the response to the control device 210 utilizing a multi-cast protocol (e.g., multi-cast protocol 211). When the control device 210 receives the response (communication) from one or more network devices 140, the control device 210 inspects and decodes the communication. In such a case, the control device 210 can determine the source address of the communication and process the communication according to logic rules.

In certain example embodiments, to ensure delivery of a communication sent by the control device 210, each network device 140 with its target address included in the communication is required to send an acknowledgement back to the control device 210 when the network device 140 acts on the communication. Deterministic behavior can be accomplished by the control device 210, creating a list of all target addresses from which the control device 210 expects a response (communication) within a pre-determined period of time. If all responses to a communication sent by the control device 210 are not received, the control device 210 initiates an automatic resend of the communication.

When a communication is resent by the control device 210, a network device 140 that has already responded to a prior sending of that communication can ignore the resent communication. This process is repeated at least 1 time, and is determined by a threshold count according to logic rules. After all resends of the communication have been exhausted, the control device 210 can determine which network devices 140 failed to respond to the communications sent by the control device 210. This approach allows for deterministic behavior of messaging, even in situations where the communication network is degraded or congested.

The communication network 200 of FIG. 2A utilizes multiple communication channels (e.g., communication channel 250, communication channel 251, communication channel 252, communication channel 259), substantially similar to the communication channels described above with respect to FIG. 1. The communication network 201 of FIG. 2B utilizes multiple communication channels (e.g., communication channel 250, communication channel 251, communication channel 252, communication channel 259) as in the communication network 200 of FIG. 2A, but also has an additional communication channel 260 between the control device 210 and the network 120. In such a case, the communication channel 250 and the communication channel 260 can be a pair of communication channels. As an example, the communication channel 250 can be used for communications sent by the control device 210, and the communication channel 260 can be used for communications (e.g., responses) sent to the control device 210.

The communication network 202 of FIG. 2C utilizes multiple communication channels (e.g., communication channel 250, communication channel 251, communication channel 252, communication channel 259) as in the communication network 200 of FIG. 2A and the communication network 201 of FIG. 2B, but also has an additional communication channel 260 between the control device 210 and the network 120, as well as additional communication channels (e.g., communication channel 261, communication channel 262, communication channel 269) between the network 120 and the various network devices 140. In such a case, a pair of communication channels can be in place between the network 120 and every device (e.g., control device 210, network devices 140) in the communication network 202. As with FIG. 2B, one of the communication channels in the pair can be used for outgoing communications, while the other communication channel in the pair can be used for incoming communications.

Those skilled in the art will appreciate that other configurations of an example communication system can exist. For example, a pair of communication channels can be utilized between the network 120 and one or more of the network devices 140, where a single communication channel 250 is used between the network 120 and the control device 210. As another example, multiple pairs of communication channels can be used in some or all of a communication system, where one of the pairs is used based on the priority of the communication involved.

In certain example embodiments, one or more of the network devices 140 sends a response to a communication received from the control device 210 after a delay. The delay can be unique to each of the network devices 140 within the communication network. Thus, when a communication is sent (broadcast) by the control device 210 and subsequently received at substantially the same time by all of the network devices 140 in the communication network, the responses sent by the network devices 140 are staggered so that the control device 210 does not receive all of the responses at substantially the same time. Instead, with each network device 140 sending its response according to its own unique delay, the responses are distributed, preventing a temporary surge in processing requirements by the control device 210.

The control device 210 can be communicably coupled to each of the network devices 140 using wired and/or wireless technology. In some cases, a network device 140 can be communicably coupled to one or more other network devices 140 in the communications network. In certain example embodiments, one of the network devices 140 is designated as a control device 210. In such a case, the control device 210 can be used to direct its own functions as well as command and control the other network devices 140 in the communications network.

The control device 210 can send communications (e.g., commands, requests for information) to one or more network devices 140. Such communications can be to change the state of one or more network devices 140, to receive the status of one or more network devices 140, to repeat a command to change the status of one or more network devices 140, or to perform some other function. In certain example embodiments, the control device 210 in a communication system (e.g., communication system 200) can be a network device in a larger communication system.

Figure 3:
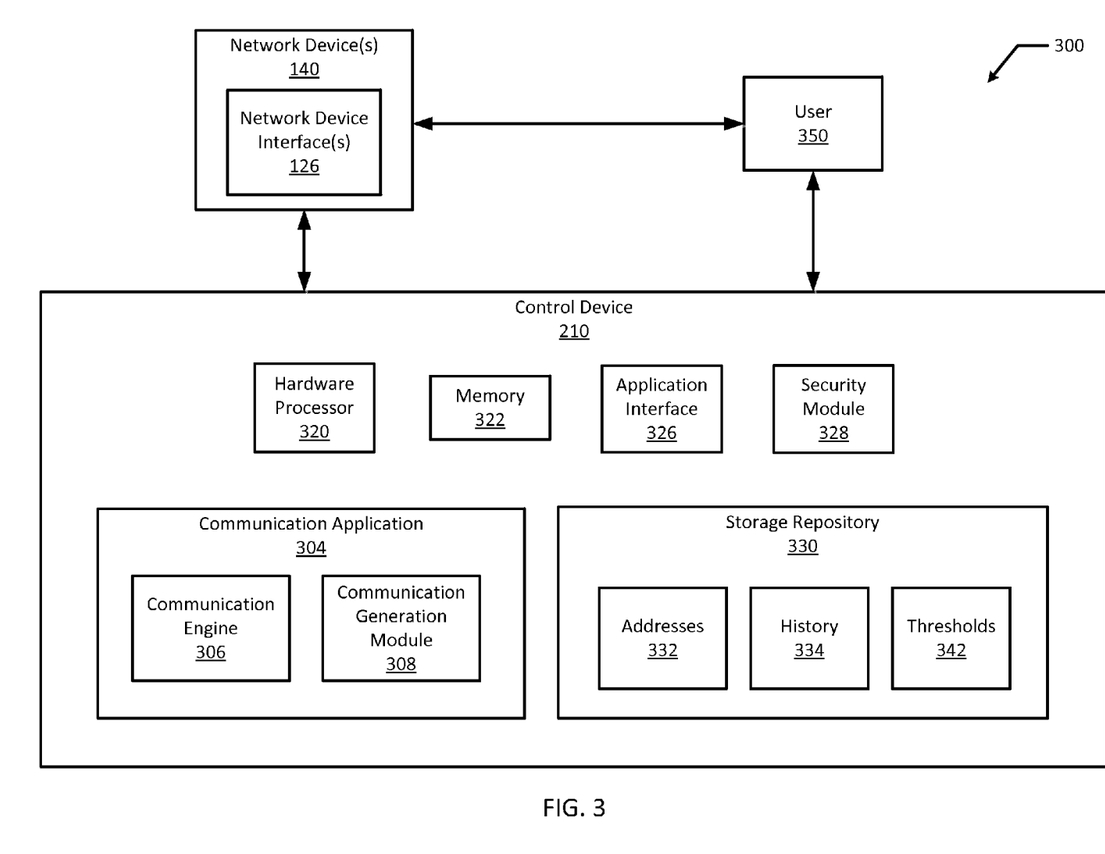
FIG. 3 shows a diagram of a system in accordance with one or more example embodiments.

FIG. 3 shows a diagram of a system 300 in accordance with one or more example embodiments. The system 300 can be part of the communication system (e.g., communication system 200) described above with respect to FIGS. 2A-2C. The system 300 can include the control device 210, one or more network devices 140, and a user 350. The control device 210 includes a communication application 304, a storage repository 330, a hardware processor 320, a memory 322, an application interface 326, and, optionally, a security module 328. The communication application 304 can include a communication engine 306 and a command generation module 308. The storage repository 330 can include addresses 332, history 334, and thresholds 342. The one or more network devices 140 can include a communication application 126.

Each of these components is described in further detail below. Example embodiments are not limited to the configuration shown in FIG. 3 and discussed herein. Additionally, although certain components have been enumerated as being part of the system 300, it is understood that some components are combined with other components and/or some components are further divided into additional components in other alternative example embodiments.

In one or more example embodiments, the control device 210 is implemented according to a client-server topology. The control device 210 may correspond to enterprise software running on one or more servers, and in some embodiments may be implemented as a peer-to-peer system, or resident upon a single computing system. In addition, the control device 210 may be accessible from other machines using one or more application programming interfaces and/or user interfaces. In one or more example embodiments, the control device 210 may be accessible over a network (e.g., network 120), such as the Internet, by one or more users 350. Further, information and/or services provided by the control device 210 may also be stored and accessed over the network.

Alternatively or additionally, in one or more example embodiments, the control device 210 is a local computer system of the user 350. In such embodiments, the control device 210 is, optionally, not implemented using a client-server topology. For example, the control device 210 corresponds to a laptop computer, desktop computer, mobile device, another type of computing device, or a combination of multiple computing devices. Additionally or alternatively, the control device 210 is a distributed computer system and/or a multi-processor computer system in which the computer system includes multiple distinct computing devices.

Continuing with FIG. 3, a user 350 as described herein may be any person that is involved with the removal, installation, operation, and/or maintenance of a communication system and/or devices (e.g., network device 140, control device 210) within a communication system. Examples of a user may include, but are not limited to, a company representative, an electrician, an engineer, a mechanic, an operator (local or remote), a consultant, a contractor, and a manufacturer's representative. A user 350 can interact with a communication system or any portion thereof directly or remotely.

The user 350 uses one or more applications to communicate with the control device 210 and/or one or more network devices 140 in accordance with one or more example embodiments. For example, the user 350 receives a notification from the control device 210 as to the operation or lack of operation of a particular network device 140. According to some example embodiments, the user 350 sends information (e.g., user preferences, settings, data) to the control device 210 and/or the network devices 140 in a number of manners (e.g., modes of communication), including but not limited to a direct input, over the Internet, some other suitable mode for sending information, or any combination thereof.

In certain example embodiments, the information sent by the user 350 to the control device 210 and/or the network devices 140 is delivered automatically (e.g., according to a default setting, a consumer preference, an occurrence of an event) or on demand, for example, in response to a notice from the control device 210 and/or a network device 140. The control device 210 and/or the network devices 140 interact with the user 350 in the same manner that the user 350 interacts with the control device 210 and/or the network devices 140, or in a different manner using different modes of communication. The user 350 uses a user system (not shown), which is discussed below in further detail, to interact with the control device 210 and/or the network devices 140 using software (not shown) in accordance with one or more example embodiments.

In one or more example embodiments, each network device 140, using the communication application 126, sends communications (e.g., responses, information) to, and receives communications (e.g., a request for information, a command) from, the control device 210. The communications are delivered automatically (e.g., according to a default setting, a user preference, an occurrence of an event) or on demand, as from a request made by the control device 210. The communications provided by the network devices 140 can include, but are not limited to, the status of the network device 140, an acknowledgment of receipt of a communication from the control device 210, and a change in the status of the network device 140.

Each network device 140, using the communication application 126, interacts with the control device 210 in the same mode of communication that the control device 210 interacts with the network device 140 or using different modes of communication in alternative example embodiments. In one or more example embodiments, each network device 140 uses a system (not shown) to interact with the control device 210 using the communication application 126 and network device software, which is discussed in further detail below. The control device 210 also can be implemented as a browser extension according to some example embodiments. In such a scenario, user software and/or network device software interacts directly with the control device 210 as a browser extension.

In addition to sending and receiving communications, the communication application 126 of each network device 140 can interpret a communication sent by the control device 210. The communication application 126 of each network device 140 can also generate a response and/or other form of communication that is sent to the control device 210. Such a response and/or other form of communication can include content (e.g., addresses 332) to identify the network device 140 and the control device 210. The communication application 126 of each network device 140 can also determine whether a communication received from the control device 210 is a duplicate and, if so, ignore the subsequent communication if a response was already sent to the original communication.

The communication application 126 of a network device 140 can also determine a delay (e.g., an amount of time) that a communication to be sent by the network device 140 to the control device 210 must undergo before being sent. In such a case, the delay for one network device 140 can be different from the delay of the other network devices 140 in the system 300. Such a delay can be a default value for a network device 140, assigned to the network device 140 by the control device 210, and/or obtained in some other manner. The communication application 126 of a network device 140 can also determine which communication channel(s) and/or which protocol to use in sending a communication to the control device 210. In some cases, the communication application 126 of a network device 140 can choose one or more communication channel(s) and/or a protocol based on the corresponding communication received from the control device 210.

Continuing with FIG. 3, the control device 210 interacts with the user 350 and/or each network device 140 using an application interface 326 in accordance with one or more example embodiments. Specifically, the application interface 326 of the control device 210 receives input (communications) from and sends output (communications) to the user 350 and/or each network device 140. The user 350 and/or each network device 140 includes an interface to receive communications from and send communications to the control device 210 in certain example embodiments. Examples of this interface include, but are not limited to, a graphical user interface, an application programming interface, a keyboard, a monitor, a mouse, a web service, a data protocol adapter, some other hardware and/or software, or any suitable combination thereof.

In one or more embodiments of the invention, the communications received by the application interface 326 can include, but is not limited to, state of operation, user preferences, commands, settings, and feedback. The communications sent by the application interface 326 can include, but is not limited to, a request for status of a network device 140, a notification of a non-responding network device, a command to change the status of a network device 140, and a request for additional information. The communication sent by the application interface 326 can specify, but is not limited to, a user 350, one or more network devices 140, a Uniform Resource Identifier (URI) (e.g., a Uniform Resource Locator (URL), a web address, etc.), information generated by and/or requested by the communication engine 306, some other software or source of information, or any suitable combination thereof.

In one or more example embodiments, the communications transferred among the application interface 326, the user 350, and/or each network device 140 corresponds to metadata associated with such information. In this case, the metadata describes the data specified (i.e., the metadata provides context for the specified data). In one or more example embodiments, the control device 210 and/or one or more network devices 140 supports various data formats provided by the user 350 and/or one or more other network devices 140.

Continuing with FIG. 3, the control device 210 retrieves and stores addresses 332, history 334, and thresholds 342. More specifically, the control device 210 uses the communication engine 306 to retrieve and store addresses 332, history 334, and thresholds 342 in the storage repository 330 in accordance with one or more example embodiments.

In one or more example embodiments, an address 332 is a unique identifier (the target address, as described above) for a network device 140. The addresses 332 of the storage repository 330 can include the address of some or all of the network devices 140 in the system 300. An address can also be the unique identifier of the control device 210. Each address is fixed in certain example embodiments, or is adjusted based on a logic rule, user input, and/or any other information that can affect or alter an address.

In one or more example embodiments, the history 334 of the storage repository 330 is based on previous communications sent and/or received by the control device 210. Some or all history 334 can be stored in the storage repository 330. For example, only the previous 24 hours of communications may be stored in the history 334 of the storage repository 330. The history can be associated with a time. Time in this case can be a clock time, an interval of time, or some other measure of time. Thus, when history 334 is stored in the storage repository 330, the history 334 can be associated with a network device 140 (based, for example, on the addresses 332) and/or with a particular time. In this way, the control device 210 can measure the current state of one or more network devices 140 and/or whether the one or more network devices 140 has changed state compared to a communication with a network device 140 at some prior point in time.

In one or more example embodiments, the thresholds 342 of the storage repository 330 are a measure of one or more of a number of communications and/or parameters. Specifically, the thresholds 342 represent values or ranges of values that measure the state (or change in state, including the responsiveness or non-responsiveness) of a network device 140. The thresholds 342 can be in terms of a number of communications and/or any other appropriate measure of the state and/or performance of one or more network devices 140.

A number of different thresholds 342 can be stored in the storage repository 330. Each threshold 342 can be a single number, a range of numbers, a word, and/or some other suitable measure depending upon the example embodiment. Each threshold 342 is fixed according to some example embodiments, while in other example embodiments, each threshold 342 varies based on one or more of a number of factors, including but not limited to user input, operational history, and function of the network device 140.

Continuing with FIGS. 1-3, the storage repository 330 can be a persistent storage device (or set of devices) that stores software and data used to assist the communication engine 306 in communicating with the network devices 140 within the system 300. In one or more example embodiments, the storage repository 330 stores the addresses 332, history 334, and thresholds 342. Examples of a storage repository 330 include, but are not limited to, a database (or a number of databases), a file system, a hard drive, some other form of data storage, or any suitable combination thereof. The storage repository 330 is located on multiple physical machines, each storing all or a portion of the addresses 332, history 334, and thresholds 342 according to some example embodiments. Each storage unit or device can be physically located in the same or different geographic location. The storage repository 330 can be operatively connected to the communication application 304. In one or more example embodiments, the communication application 304 includes functionality to communicate with the network devices 140 in the system 300. More specifically, the communication application 304 sends information to and/or receives information from the storage repository 330 in order to communicate with the network devices 140.

The functions of the communication application 304 can be performed on a single computing device or on multiple computing devices (for example, on different network devices 140). When the functions of the communication application 304 are performed on multiple computing devices, a number of configurations and/or frameworks are used in certain example embodiments. The configurations and/or software frameworks are designed to work with multiple data nodes and large quantities of data. One or more calculations performed by one or more components of the communication application 304 are performed on multiple machines operating in parallel, where the results from each machine are combined to generate a result to the one or more calculations.

Each component of the communication application 304 described herein (specifically, the communication engine 306 and the communication generation module 308) uses addresses 332, history 334, and/or thresholds 342 to generate and send a communication to the network devices 140. In one or more example embodiments, the communication engine 306 of the communication application 304 coordinates the communication generation module 308, the storage repository 330, and, optionally, the security module 328. Specifically, the communication engine 306 coordinates the transfer of information between the application interface 326, the communication generation module 308, and the storage repository 330 according to certain example embodiments.

Further, the communication engine 306 also retrieves the addresses 332, history 334, and the thresholds 342 from, and sends the addresses 332, history 334, and the thresholds 342 to the storage repository 330 for use by the communication generation module 308 and the communication engine 306. The communication engine 306 can also retrieve the addresses 332, history 334, and/or the thresholds 342 from the storage repository 330 to be sent to the user 350.

In certain example embodiments, the communication engine 306 instructs the communication generation module 308 to generate one or more communications for one or more network devices 140. The communication engine 306 can instruct the communication generation module 308 continuously, at regular intervals, upon the occurrence of some event (e.g., a change in status of a network device 140, a communication received from a user 350), and/or randomly. The communication generation module 308 can generate any type of communication for one or more network devices 140 and/or a user 350. Examples of such types of communication can include, but are not limited to, an instruction (e.g., to change state, to perform an operation), a request for information (e.g., current status of a network device 140), and report of status of the network devices 140.

The type of communication generated by the communication generation module 308 can be based on logic rules, an instruction from the communication engine 306, and/or some other factor. Similarly, the particular network devices 140 that are the intended recipients of a communication generated by the communication generation module 308 can be determined by the communication engine 306, logic rules, and/or some other factor. In any case, the addresses 332 of the intended recipients are provided to the communication generation module 308 by the communication engine 306. Once received, the communication generation module 308 incorporates the addresses 332 into the communication generated by the communication generation module 308.

When the communication generated by the communication generation module 308 is complete, the communication engine 306 sends the communication through the various communication channels and the network 120. As stated above, in certain example embodiments, the communication is broadcast by the communication engine 306 throughout the system 300 so that all network devices 140 receive the communication. In such a case, a multi-cast network protocol 211 can be used. A request can also be sent to one or more specific network devices 140 (e.g., the intended recipients) according to some example embodiments. Any communication sent and/or received by the communication engine 306 can be executed using the application interface 326.

When the communication engine 306 receives one or more communications from the network devices 140, the communication engine 306 can also determine whether all of the intended recipients (also called the recipient devices) among the network devices 140 in the system 300 have responded to a prior communication sent by the communication engine 306. For example, as stated above, logic rules may require that the recipient devices of a communication sent by the communication engine 306 send a response (e.g., receipt acknowledgment, status of the network device 140) to the communication engine 306.

If the communication engine 306 has not received an appropriate response communication (or any communication) within a certain amount of time from all recipient devices, the communication engine 306 can resend the communication and/or send a different communication to some (e.g., the recipient devices) or all of the network devices 140. In such a case, the communication engine 306 can determine whether a particular network device 140 is functioning properly and/or whether one or more of the communication channels has failed. The communication engine 306 can repeat this process any of a number of times.

In certain example embodiments, the communication engine 306 resends a communication, if necessary, according to a threshold count stored in the thresholds 342 in the storage repository 330. In such a case, the communication engine 306 can also include a counter. If a network device 140 that is an intended recipient device becomes a non-responding device (by virtue, for example, of not sending a response communication), the communication engine 306 can track the number of times a communication has been sent without receiving a response communication from a non-responding device. In addition, or in the alternative, the timer function of the communication engine 306 can track an amount of time between events (e.g., communications).

Continuing with FIGS. 1-3, the hardware processor 320 within the control device 210 executes software in accordance with one or more example embodiments. Specifically, the hardware processor 320 executes the control device 210 or any of the engines and repositories described above and shown in FIG. 3, as well as software used by the user 350 and/or one or more network devices 140. The hardware processor 320 can be an integrated circuit, a central processing unit, a multi-core processing chip, a multi-chip module including multiple multi-core processing chips, or other hardware processor in one or more example embodiments. The hardware processor 320 is known by other names, including but not limited to a computer processor, a microprocessor, and a multi-core processor. In one or more example embodiments, the hardware processor 320 executes software instructions stored in memory 322. The memory 322 includes one or more cache memories, main memory, and/or any other suitable type of memory. The memory 322 is discretely located on the control device 210 relative to the hardware processor 320 according to some example embodiments. In certain configurations, the memory 322 also is integrated with the hardware processor 320.

Optionally, in one or more example embodiments, the security module 328 secures interactions between the control device 210, the user 350 and/or the network devices 140. More specifically, the security module 328 authenticates communication from software based on security keys verifying the identity of the source of the communication. For example, user software may be associated with a security key enabling the user software to interact with the control device 210 and/or the network devices 140. Further, the security module 328 restricts receipt of information, requests for information, and/or access to information in some example embodiments.

The user software can interact with the control device 210 and/or the network devices 140 using a browser extension. In this case, the browser extension maintains an active session with the control device 210 and/or the network devices 140 after the security module 328 has authenticated the user software. For example, the browser extension continues to interact with the control device 210 as the user 350 views various web content in the user software. In this example, the browser extension receives notifications from the control device 210 for presenting to the user 350.

As discussed above, the user 350, control device 210, and network devices 140 can use their own system or share a system in certain example embodiments. Such a system can be, or contain a form of, an Internet-based or an intranet-based computer system that is capable of communicating with various software. A computer system includes any type of computing device and/or communication device, including but not limited to the control device 210. Examples of such a system can include, but are not limited to, a desktop computer with Internet or intranet access, a laptop computer with Internet or intranet access, a smart phone, a server, a server farm, and a personal digital assistant (PDA). Such a system can correspond to a computer system as described below with regard to FIG. 5.

Further, as discussed above, such a system can have corresponding software (e.g., user software and network device software). The software can execute on the same or a separate device (e.g., a server, mainframe, desktop personal computer (PC), laptop, personal desktop assistant (PDA), television, cable box, satellite box, kiosk, telephone, mobile phone, or other computing devices) and can be coupled by a network 120 (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 300.

In certain example embodiments, the control device 210 does not include a hardware processor 320. In such a case, the control device 210 can include, as an example, one or more field programmable gate arrays (FPGA). Using FPGAs and/or other similar devices known in the art allows the control device 210 to be programmable and function according to certain logic rules and thresholds without the use of a hardware processor.

Figure 4:
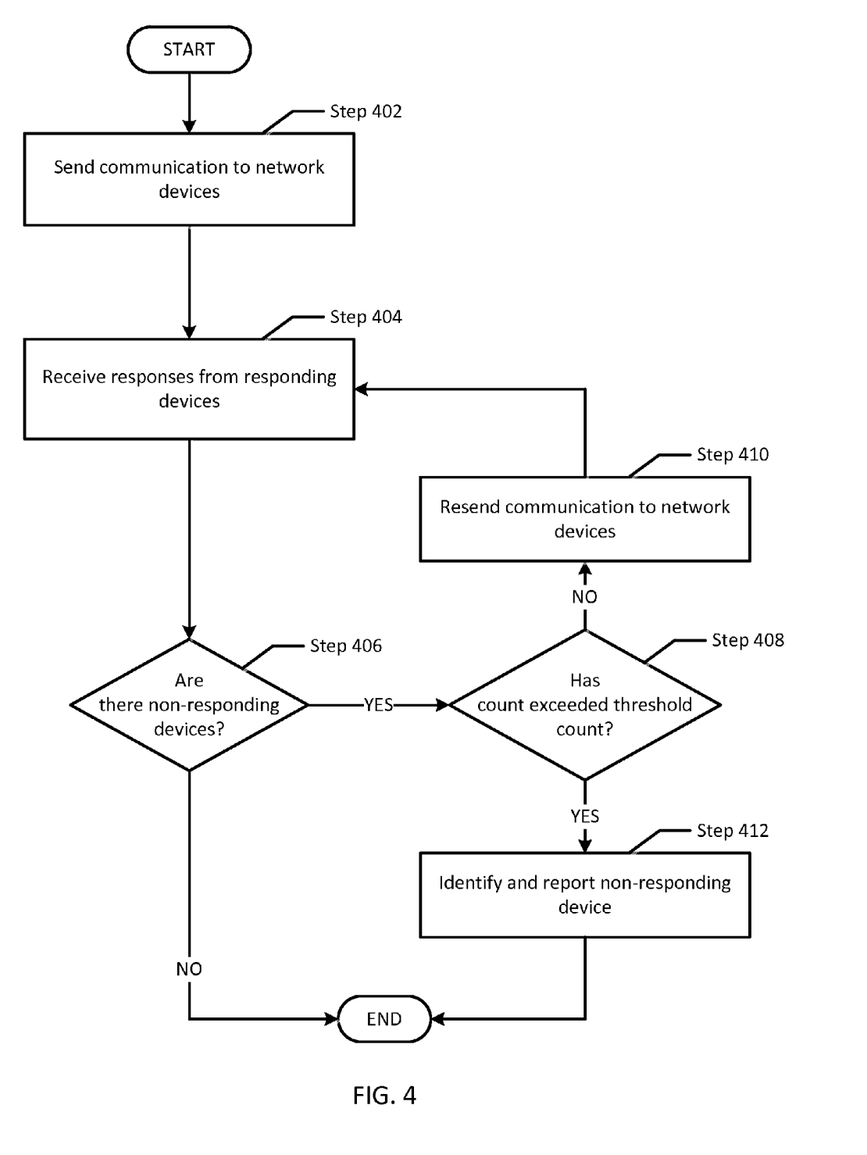
FIG. 4 shows a flowchart of a method in accordance with one or more example embodiments.

FIG. 4 is a flow chart presenting a method 400 for communicating with a number of network devices in accordance with certain example embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the example embodiments, one or more of the steps described below may be omitted, repeated, and/or performed in a different order.

In addition, a person of ordinary skill in the art will appreciate that additional steps not shown in FIG. 4 may be included in performing this method. Accordingly, the specific arrangement of steps should not be construed as limiting the scope. Further, a particular computing device, as described, for example, in FIG. 5 below, can be used to perform one or more of the steps for the method 400 described below in certain exemplary embodiments.

Referring now to FIGS. 1-4, the example method 400 begins at the START step and proceeds to step 402, where a communication is sent to one or more network devices 140. The communication can be generated and sent by the control device 210 (or, more specifically, the communication engine 306 of the control device 210). The communication can be broadcast to all of the network devices 140 in the system 300 using a multi-cast network protocol 211. The communication can include a unique target address for each network device 140 to which the communication is intended. In other words, even though the communication is sent to all network devices 140, only those network devices 140 whose unique address is included in the communication will be able to determine the contents of the communication.

In certain example embodiments, the size of the communication, including the target addresses for the intended recipient network devices 140, is limited. For example, the size of a communication may be no larger than one Ethernet frame (about 1,400 bytes). By limiting the size of the communication to one Ethernet frame, communication stability can be improved, especially when conditions of some or all components (e.g., a communication channel, the network 120) of the communication network are poor. Alternatively, the size of a communication may be the same size as or larger than one Ethernet frame. The communication can be sent using one or more communication channels and/or a network 120 in the system 300. In some cases, one or more particular communications channels are used, based on a priority and/or other characteristic of the communication. The communication can be for any purpose, as determined by the control device 210.

In step 404, one or more responses are received from the network devices 140. In certain example embodiments, the responses are sent by the network devices 140 in response to the communication sent by the control device 210. In certain example embodiments, the responses are received by the control device 210. The responses can more generally be called communications. The network devices 140 that send the responses can be called responding devices. The responding devices can be some or all of the intended recipient network devices 140 whose addresses were included in the communication of step 402. Each response can include the address of the responding device sending the communication. Each response can also include the address of the control device 210 receiving the response.

A response received from a network device 140 can use the same communication channel(s) on which the communication of step 402 was sent by the control device 210. Alternatively, the response received from a network device 140 can use one or more different communication channel(s) from those used to send the communication of step 402. In the latter case, the communication channels used in step 402 and step 404 can be a pair of communication channels. A system 300 can have multiple pairs of communication channels. In such a case, a communication is sent on one of the pairs of communication channels based on the priority and/or other characteristic of the communication, which can be determined, for example, by the control device 210.

In step 406, once the responses of step 404 are received, a determination is made as to whether there are non-responding devices among the intended recipient network devices 140. In certain example embodiments, the determination is made by the control device 210. For this determination to be made, the control device 210 can compare the address of each response received in step 404 against the addresses included in the communication sent in step 402. Any addresses in the communication sent in step 402 that are not associated with a response received in step 404 are addresses of one or more non-responding devices. If there are non-responding devices, the process proceeds to step 408. If there are no non-responding devices (i.e., each of the intended recipient network devices sent a response), the process proceeds to the END step.

In step 408, a determination is made as to whether a count has exceeded a threshold count. The determination is made by the control device 210. The threshold count is among the thresholds 342 stored in the storage repository, and the count is made by the control device 210. The count can be based on the number of times that a communication has been sent by the control device 210. In certain example embodiments, a criteria (e.g., history 334 of a slow response by a network device 140) other than, or in addition to, a count can be used to determine if a threshold has been exceeded. The threshold count can vary based on one or more of a factors, including but not limited to the priority of the communication, the number of intended recipient network devices, the time between resending a communication, and the protocol (e.g., multi-cast network protocol 211) used for the communication. If the count exceeds the threshold count, the process proceeds to step 412. If the count does not exceed the threshold count, the process proceeds to step 410.

In step 410, a communication is resent to the network devices 140. The communication can be identical or substantially similar to the communication of step 402. Specifically, the communication can include the addresses 332 of the intended recipient network devices 140, including the responding devices (i.e., the network devices 140 that have already responded to a prior communication on which the resent communication is based). The communication can be resent in the same or a different manner than the manner in which the original communication and/or any prior related communication was sent. After step 410 is complete, the process can revert to step 404.

In step 412, one or more non-responding devices is identified. The one or more non-responding devices can also be reported (e.g., a notification can be sent to a user 350). In certain example embodiments, the non-responding devices can be identified and reported by the control device 210. In addition, or in the alternative, the control device 210 can identify and report other components of the system that are not working properly. For example, if multiple intended recipient network devices 140 share the same communication channel, and if all of those intended recipient network devices 140 are non-responding devices, the control device 210 may determine that the communication channel, rather than the non-responding devices, should be reported. After step 412 is complete, the process can proceed to the END step.

Figure 5:
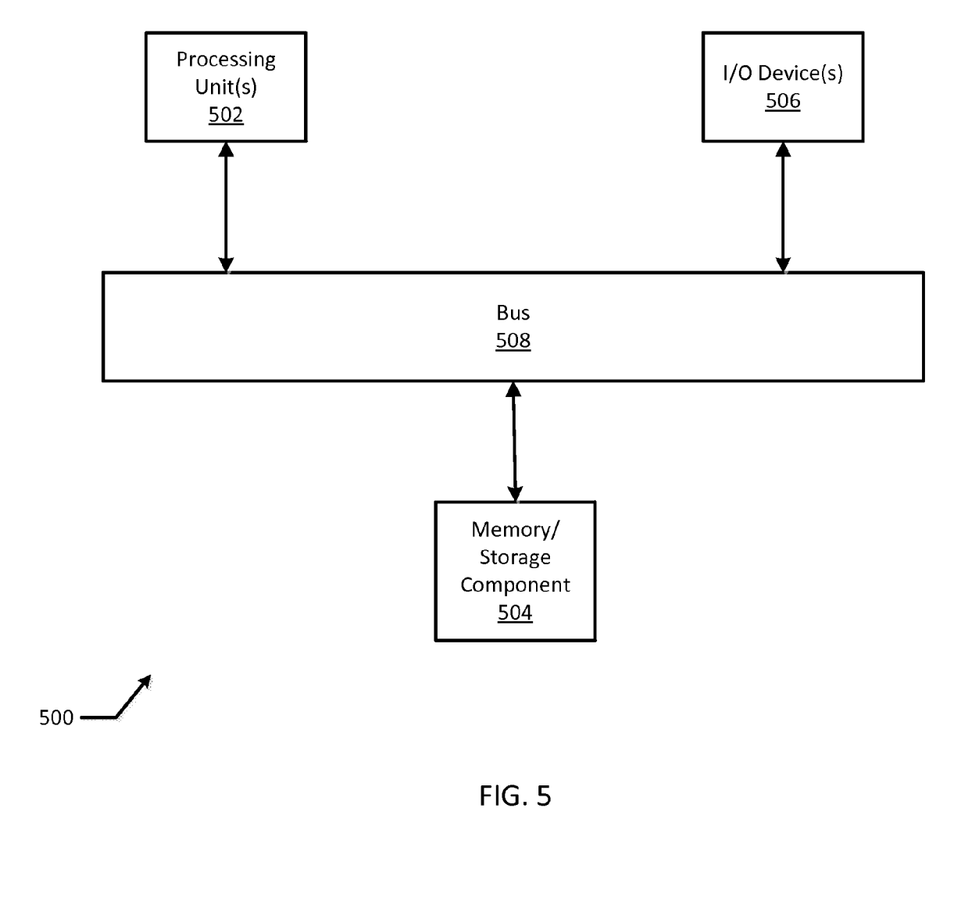
FIG. 5 shows a computing device in accordance with one or more example embodiments.

FIG. 5 illustrates one embodiment of a computing device 500 that implements one or more of the various techniques described herein, and which is representative, in whole or in part, of the elements described herein pursuant to certain exemplary embodiments. Computing device 500 is one example of a computing device and is not intended to suggest any limitation as to scope of use or functionality of the computing device and/or its possible architectures. Neither should computing device 500 be interpreted as having any dependency or requirement relating to any one or combination of components illustrated in the example computing device 500.

Computing device 500 includes one or more processors or processing units 502, one or more memory/storage components 504, one or more input/output (I/O) devices 506, and a bus 508 that allows the various components and devices to communicate with one another. Bus 508 represents one or more of any of several types of bus structures, including a memory bus or memory controller, a peripheral bus, an accelerated graphics port, and a processor or local bus using any of a variety of bus architectures. Bus 508 includes wired and/or wireless buses.

Memory/storage component 504 represents one or more computer storage media. Memory/storage component 504 includes volatile media (such as random access memory (RAM)) and/or nonvolatile media (such as read only memory (ROM), flash memory, optical disks, magnetic disks, and so forth). Memory/storage component 504 includes fixed media (e.g., RAM, ROM, a fixed hard drive, etc.) as well as removable media (e.g., a Flash memory drive, a removable hard drive, an optical disk, and so forth).

One or more I/O devices 506 allow a customer, utility, or other user to enter commands and information to computing device 500, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 500 is connected to a network (not shown) (e.g., a local area network (LAN), a wide area network (WAN) such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 500 includes at least the minimal processing, input, and/or output means necessary to practice one or more embodiments.

Further, those skilled in the art will appreciate that one or more elements of the aforementioned computer device 500 is located at a remote location and connected to the other elements over a network in certain exemplary embodiments. Further, one or more embodiments is implemented on a distributed system having one or more nodes, where each portion of the implementation (e.g., communication engine 306) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Using example embodiments of communicating with network devices allows a user and/or a control device to understand, in real time, when one or more network devices fail to operate in the manner expected. This information can be used during steady state operation of one or more network devices and/or when the state of one or more network devices changes. Existing equipment (e.g., network, communication channels) needed to communicate with network devices can be used, so additional resources needed to use example embodiments are minimal. Installation or alteration of a control device (and its corresponding functionality as described herein) may also be minimal. Specifically, if a control device already is in place, a simple addition to existing operating parameters and/or change in software/logic rules can be installed. If a control device is not already in place, one can be installed seamlessly, often using wireless or a minimal amount of wired technology.

Example embodiments are more efficient than existing communication systems. Specifically, example embodiments use less bandwidth, fewer communication channels, and significantly less processing capability. As a result, processing equipment present fewer thermal issues using example embodiments. Further, costs of installing, replacing, and/or maintaining a communication system using example embodiments is reduced. Thus, labor costs can also be reduced using example embodiments.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system for communicating with a network of devices, comprising:
   a control device configured to send a first digital communication using a multi-cast network protocol;
   a plurality of network devices communicably coupled to the control device, wherein each network device of the plurality of network devices has a unique address and is configured to receive the first digital communication using the multi-cast network protocol; and
   a first communication channel communicably coupled to the control device and the plurality of network devices,
   wherein the first digital communication sent by the control device is sent to all of the plurality of network devices using the first communication channel,
   wherein the first digital communication comprises the unique address of each network device of a plurality of recipient devices and lacks the unique address of each network device of a remainder of the network devices,
   wherein the plurality of network devices comprises the plurality of recipient devices and the remainder of network devices,
   wherein the plurality of recipient devices receive and read the first communication,
   wherein the plurality of recipient devices send a plurality of second communications to the control device, wherein each of the plurality of second communications comprises the unique address and confirms receipt of the first communication by a recipient device,
   wherein the remainder of network devices receives and ignores the first communication,
   wherein the recipient device that fails to send a second communication is a non-responsive device,
   wherein the control device resends the first communication to the plurality of recipient devices when a first number of recipient devices exceeds a second number of second communications, and
   wherein each of the plurality of recipient devices that sent the second communication ignores the resent first communication.

2. The system of claim 1, further comprising:
   a second communication channel communicably coupled to the control device and the plurality of network devices,
   wherein the plurality of second communications is sent to the control device using the second communication channel.

3. The system of claim 2, further comprising:
   a plurality of pairs of communication channels communicably coupled to the control device and the plurality of network devices,
   wherein the first communication channel and the second communication channel comprise a pair of communication channels of the plurality of pairs of communication channels.

4. The system of claim 2, wherein each of the plurality of recipient devices sends its second communication after a delay from receiving the first communication, wherein the delay for a network device is unique compared to the delay for the remainder of the network devices.

5. The system of claim 1, wherein the control device is one of the plurality of network devices.

6. A method for communicating with a plurality of network devices, comprising:
   sending, using a hardware processor, a first communication on a first communication channel from a control device to the plurality of network devices using a multi-cast network protocol;
   receiving, by the control device, at least one second communication from at least one recipient device;
   determining, by the control device, that a first number of recipient devices exceeds a second number of second communications; and
   resending, by the control device, the first communication to the plurality of recipient devices,
   wherein each network device of the plurality of network devices has a unique address,
   wherein the first communication comprises the unique address for each network device of a plurality of recipient devices and lacks the unique address of each network device of a remainder of network devices, wherein the plurality of network devices comprises the plurality of recipient devices and the remainder of network devices,
   wherein the plurality of recipient devices receive and read the first communication, wherein the remainder of network devices receives and ignores the first communication, wherein each second communication comprises the unique address and confirms receipt of the first communication by the recipient device, wherein each of the plurality of recipient devices that sent the second communication ignores the resent first communication, and wherein the recipient device that fails to send the second communication is a non-responsive device.

7. The method of claim 6, wherein the first communication and the at least one second communication are sent using a first communication channel.

8. The method of claim 6, where the at least one second communication is sent using the multi-cast network protocol.

9. The method of claim 8, wherein each recipient device sends the second communication after a delay, wherein the delay is unique to each of the plurality of network devices.

10. The method of claim 8, wherein the at least one second communications is sent using a second communication channel.

11. The method of claim 10, wherein the first communication channel and the second communication channel comprise a first pair of communication channels, wherein the first pair of communication channels is among a plurality of pairs of communication channels, wherein the first pair of communication channels is used based on a priority of the first communication.

12. The method of claim 8, wherein the first communication is resent by the control device using the multi-cast network protocol.

13. The method of claim 12, wherein the resent first communication is ignored by each non-responsive device.

14. The method of claim 12, further comprising:
receiving, after resending the first communication, at least one third communication from at least one non-responding device, wherein the at least one third communication is sent using the multi-cast network protocol.

15. The method of claim 14, further comprising:
determining that the first number exceeds a third number of third communications;
determining that sending the first communication and resending the first communication exceeds a threshold count of communications; and identifying, using the unique address, the at least one non-responding device as a non-functioning device.

16. The method of claim 8, wherein the multi-cast network protocol is a real-time protocol.

17. The method of claim 8, wherein the first communication has a size that is no greater than an Ethernet frame.

18. A non-transitory computer readable medium comprising computer readable program code embodied therein for a method of communicating with a plurality of network devices, the method comprising:

sending, by a control device, a first communication on a communication channel to the plurality of network devices using a multi-cast network protocol;

receiving, by the control device, at least one second communication from at least one recipient device;

determining, by the control device, that a first number of recipient devices exceeds a second number of second communications; and resending, by the control device, the first communication to at least one recipient device, wherein each network device of the plurality of network devices has a unique address, wherein the first communication comprises the unique address for each network device of a plurality of recipient devices and lacks the unique address of each network device of a remainder of network devices, wherein the plurality of network devices comprises the plurality of recipient devices and the remainder of network devices, and wherein the plurality of recipient devices receive and read the first communication, and wherein the remainder of network devices receives and ignores the first communication, wherein each second communication comprises the unique address and confirms receipt of the first communication by the recipient device, wherein each of the plurality of recipient devices that sent the second communication ignores the resent first communication, and wherein the recipient device that fails to send the second communication is a non-responsive device.

* * * * *